United States Patent [19]

Ruchlak et al.

[11] 3,951,883

[45] Apr. 20, 1976

[54] PROCESS FOR THE MANUFACTURE OF PULVERULENT POLYVINYL CHLORIDE MOLDING COMPOSITIONS

[75] Inventors: Kasimir Ruchlak, Burgkirchen, Alz; Christoph Heinze, Burghausen, Salzach; Rolf Kränzle, Burgkirchen, Alz, all of Germany

[73] Assignee: Hoechst Aktiengesellschaft, Frankfurt am Main, Germany

[22] Filed: Feb. 28, 1974

[21] Appl. No.: 446,779

[30] Foreign Application Priority Data

Jan. 18, 1974 Germany.......................... 2402314

[52] U.S. Cl............................ 260/2.5 M; 260/2.5 B; 260/17 A; 260/29.6 MQ; 526/78; 526/344; 526/225
[51] Int. Cl.² .......................................... C08J 9/24
[58] Field of Search .................. 260/92.8 W, 2.5 M

[56] References Cited
UNITED STATES PATENTS

| | | | |
|---|---|---|---|
| 3,055,876 | 9/1962 | Grotz............................ | 260/92.8 W |
| 3,057,831 | 10/1962 | Holdsworth................... | 260/92.8 W |
| 3,145,194 | 8/1964 | Heckmaier et al............ | 260/92.8 W |
| 3,205,204 | 9/1965 | Heckmaier..................... | 260/92.8 W |
| 3,226,350 | 12/1965 | Smith et al.................... | 260/92.8 W |
| 3,375,238 | 3/1968 | Bauer et al.................... | 260/92.8 W |
| 3,595,848 | 7/1971 | Reinecke et al. ............. | 260/92.8 W |

*Primary Examiner*—Morton Foelak
*Attorney, Agent, or Firm*—Connolly and Hutz

[57] ABSTRACT

Pulverulent polyvinyl chloride molding compositions capable of being sintered are produced using as emulsifier an alkyl-aryl or alkyl-sulfonic acid or a mixture thereof. Prior to or during polymerization 20 to 80 % of the emulsifier are added, optionally together with other auxiliaries, and the balance is applied to the separated polymer. The molding compositions are especially suitable for the manufacture of separating plates for electric cells.

6 Claims, 2 Drawing Figures

Fig.1.
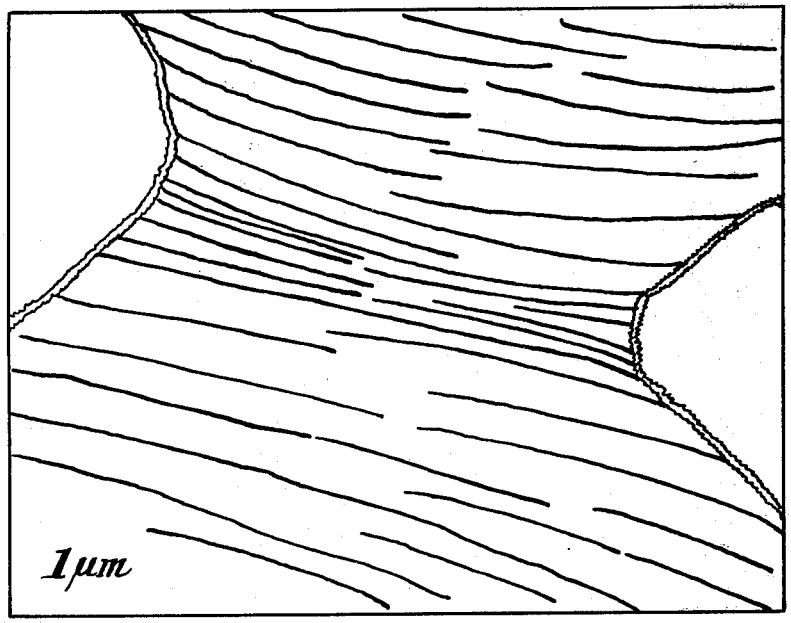
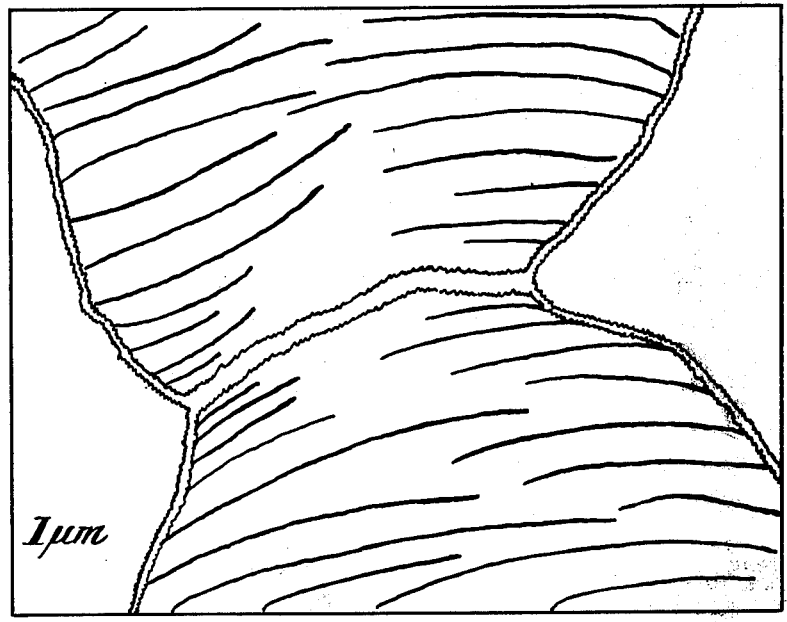
Fig.2.

PROCESS FOR THE MANUFACTURE OF PULVERULENT POLYVINYL CHLORIDE MOLDING COMPOSITIONS

The present invention relates to a process for the manufacture of pulverulent polyvinyl chloride compositions capable of being sintered.

Copending application Ser. No. 446,818 (HOE 73/F 904) filed concurrently herewith provides a process for the manufacture of a pulverulent polyvinyl chloride molding composition capable of being sintered by suspension polymerization of vinyl chloride in aqueous phase using an oil-soluble activator, in the presence of a non ionic wetting agent and an emulsifier, with separation and drying of the polymer, which comprises using as emulsifier an alkylarylsulfonic acid having from 3 to 16 carbon atoms in the alkyl chain or an alkylsulfonic acid having from 8 to 16 carbon atoms, or a mixture of the said sulfonic acids, in an amount of from 0.01 to 0.5 % by weight, calculated on monomeric vinyl chloride.

In the said process the auxiliaries, i.e. emulsifier, suspension stabilizer and non ionic wetting agent, are added to the polymerization mixture prior to the beginning of polymerization. Alternatively partial amounts of the said auxiliaries (one or several) of up to 50 % are added after the beginning of polymerization either continuously or in portions.

It is the object of the present invention to provide an improvement in the process of our copending application referred to above, which comprises adding to the polymerization mixture 30 to 80 % of the emulsifier amount prior to and optionally during the course of polymerization and applying the balance of 70 to 20 % to the polymer after its separation. Preferably 40 to 60 % of the emulsifier amount are added to the polymerization mixture prior to or during the course of polymerization and the balance of 60 to 40 % is applied to the polymer after its separation.

The total amount of suspension activators and non ionic wetting agents is advantageously added prior to the beginning of the polymerization. Optionally up to at most 50 % of the said auxiliaries can also be added during the course of polymerization. Alternatively, at most 70 %, preferably 40 % of the said auxiliaries can be applied to the separated polymer together with the emulsifier.

The polymer is separated from the aqueous medium by known methods, for example by centrifugation.

The emulsifier and optionally suspension stabilizer and/or non ionic wetting agent are applied in such a manner that as uniform as possible a mixing and, hence, as complete as possible a coating of the polymer particles is ensured. This can be done, for example by spraying. To this effect the aforesaid auxiliaries, if they are solid, are dissolved or dispersed in water or organic solvents, for example lower alcohols, lower hydrocarbons or acetone. When they are liquid, they can be applied per se or diluted with water or the aforesaid organic solvents. The solutions or dispersions suitably have a concentration of from 1 to 40 % by weight, preferably 5 to 20 % by weight.

The solution or dispersion is sprayed on to the polymer by usual spraying methods. The polymer separated by centrifugation is preferably sprayed at the outlet of the centrifuge. Alternatively, spraying can be effected during the transport by a screw or conveying device operated with air or another inert gas. The treated polymer is then dried in usual manner.

By the process of the present invention a certain difficulty, occuring during the work up of the polymer if the total amount of auxiliaries (emulsifier and others) is added prior to or during polymerization, can be overcome. When a product obtained with the addition of the total amount of auxiliaries prior to or during polymerization is centrifuged in a continuously operated decanting centrifuge, as commonly used in the working up of suspension polyvinyl chloride, the separated polymer has a residual humidity of 40 to 50 % by weight and more, which cannot be reduced even if the throughput is decreased. Owing to the tacky consistency of the product as a result of the residual humidity troubles may occur when the product is transported in the decanter itself, on its way to the drier or in the drier. Moreover, the removal of such a high amount of residual humidity in the drier requires a considerable amount of energy. As compared therewith, when a polymer obtained according to the process of the present invention is continuously centrifuged the residual humidity is reduced to 30 % by weight or still less, a degree which is reached with normal suspension polyvinyl chloride. Owing to the reduced degree of humidity of the polymer a considerable amount of energy can be saved in the drying operation per weight unit of dry product, whereby the process becomes considerably more economical. With the same amount of energy more than twice the amount of dry product can be obtained.

A further advantage resides in the fact that the polymer centrifuged to the lower residual humidity has a loose and friable consistency so that it can be conveyed without any problem. Another advantage is that with a large charge of polymer produced with determined partial amounts of the aforesaid auxiliaries within the indicated limits it is possible subsequently to modify the properties of partial amounts of the polymer charge in a desired way by varying the subsequently applied proportions of the auxiliaries.

Suitable alkylarylsulfonic acids are dialkylarylsulfonic acids, for example of naphthalene or benzene, preferably, however, monoalkylarylsulfonic acids, particularly the monoalkylbenzene-sulfonic acids. The alkyl groups contain from 3 to 16, preferably from 8 to 14, and more preferably from 10 to 12 carbon atoms in a branched or straight chain, preferably in a straight chain. Sulfonic acids of this type are, for example, dodecyl- and nonyl-benzene-sulfonic acids, diisobutyl-, diisopropyl-, and di-tert.butyl-naphthalene-sulfonic acids. The alkylsulfonic acids have from 8 to 16 and preferably 12 to 14 carbon atoms.

The sulfonic acids are used either in pure form or in the form of mixtures with one another. The alkylarylsulfonic acids are obtained especially by direct sulfonation of the corresponding alkylbenzenes or mixtures of said alkylbenzenes with $SO_3$ or oleum. The alkylsulfonic acids can be prepared, for example, by sulfoxidation with $SO_2/O_2$ of corresponding crude oil or paraffin fractions. The sulfonic acids are used in an amount of from 0.01 to 0.5 % by weight, preferably 0.08 to 0.3 % by weight, calculated on monomeric vinyl chloride.

Suitable polymerization initiators or activators are the usual oil soluble compounds, for example lauroyl peroxide, diisopropyl-peroxydicarbonate, or cyclohexyl-sulfonylacetyl-peroxide.

The polymerization is carried out in the presence of known suspension stabilizers, such as alkyl or hydroxyalkyl celluloses, for example methyl or ethyl cellulose, hydroxyethyl or hydroxypropyl cellulose, or the mixed ethers thereof, for example hydroxypropyl-methyl cellulose. Other suspension stabilizers may also be used, for example polyvinyl alcohol or partially saponified polyvinyl esters. The suspension stabilizers are generally used in an amount of from 0.05 to 0.8 % by weight, preferably 0.1 to 0.5 % by weight, calculated on monomeric vinyl chloride. The added suspension stabilizers should have a viscosity of from 200 to 700 centipoises, preferably 300 to 500 centipoises, calculated on a 2 % by weight solution at 20°C.

The non ionic wetting agent is used in an amount of from 0.01 to 0.1 % by weight, preferably 0.01 to 0.05 % by weight, calculated on monomeric vinyl chloride. Suitable wetting agents are the common ones, for example, sorbitan fatty acid esters, polyoxyethylene sorbitan fatty acid esters, as well as polymers and copolymers of alkylene oxides, for example ethylene or propylene oxide and the alkyl and aryl ethers and esters thereof.

The suspension polymerization of vinyl chloride is effected in the usual temperature range of from 50° to 70°C according to the common charge technique.

The suspension polymers obtained shall have K values of from 60 to 75, preferably 65 to 70.

The process of the invention yields products having an optimum average particle diameter for sintering of from 15 to 35 microns, preferably 15 to 25 microns, determined by sedimentation analysis. The average particle size distribution, measured by air jet screening, was found to be as follows:

| | | |
|---|---|---|
| 60 to 98 | % smaller than | 33 microns |
| 2 to 35 | % of from | 33 to 63 microns |
| 0 to 4.5 | % of from | 63 to 125 microns and |
| 0 to 0.5 | % larger than | 125 microns. |

The polymer has an apparent density of from 350 to 500 g/l, preferably 400 to 450 g/l, its plasticizer absorption is in the range of from 12 to 25 %, preferably 15 to 20 %.

The improved sintering properties of the present molding compositions with regard to the prior art were tested as follows:

With the use of n-dodecylbenzene-sulfonic acid as emulsifier in the sintering process the particles of the polymer of the invention weld together homogeneously as illustrated in the accompanying FIG. 1 of the drawing, whereas with a suspension polymer produced with an alkali metal salt emulsifier, for example sodium n-dodecylbenzene-sulfonate a distinct seam is observed along the line of weld as shown in FIG. 2 of the drawing. Separator plates made from the molding compositions of the invention by the usual band sintering have a smooth surface, very fine pores and a sufficient porosity for the electrolyte passage (determined by measuring the water absorption according to DIN 51,056). As compared with plates of known molding compositions the mechanical properties, above all the elongation at break and the tensile strength, are greatly improved. Nevertheless, they do not show any processing difficulties, they can be readily applied on the band and do not tend to form a deposit on the roll. The separator plates made with the composition of the invention have good wetting properties and foaming does not occur when the battery is charged.

The sintered plates made from the compositions of the invention have the following properties, measured with a plate having a thickness of 0.5 mm:

tensile strength 80 to 150 kg/cm$^2$, preferably 90 to 130 kg/cm$^2$ elongation at break 6 to 11 %, preferably 6.5 to 9 % water absorption 40 to 100 %, preferably 50 to 80 % by weight capillary rise 120 to 180 mm, preferably 140 to 160 mm, in a 0.5 mm thick plate.

The pulverulent molding compositions of suspension polyvinyl chloride according to the invention are well suitable for making sintered porous shaped articles and for this purpose they need not be blended with other components, for example emulsion polymers. Such porous shaped articles can be used, for example as filling bodies for cooling or trickling towers, filters, insulating material, air humidifiers, or as carrier material for ion exchangers. Owing to their excellent mechanical and electrical properties and sintering behavior they are preferably used for the manufacture of separating plates in electric cells, especially accumulators.

To characterize the pulverulent molding compositions capable of being sintered of the invention of suspension polyvinyl chloride, the following measuring methods were used:

The apparent density was determined according to DIN 53,468.

To measure the plasticizer absorption a filter paper impregnated with di-2-ethylhexyl phthalate (dioctylphthalate DOP) was tightly placed on the perforated inner bottom of a centrifuge beaker insert (laboratory centrifuge according to DIN 58,970 E) and the insert with the filter paper was weighed (weight $m_1$). Next 10.0 grams of polymer (weight $m_2$) were weighed into the insert, about 20 grams of DOP were added and the whole was allowed to stand for about 5 minutes. At a centrifuge acceleration at the bottom of the perforated insert of 25,000 to 26,000 m/sec$^2$ centrifugation was performed for 60 minutes. The insert was then wiped at its outer side with filter paper and weighed with contents (weight $m_3$). The plasticizer absorption which, inter alia, is a measurement of the porosity of the polymer grain, is calculated in % by weight according to the formula:

$$\frac{m_3 - m_2}{m_2 - m_1} \cdot 100$$

The indicated values are average values of 10 individual measurements.

The average particle diameter of the polymer was determined by sedimentation analysis as follows:

1.82 Grams of polyvinyl chloride were dispersed in 600 ml of a 0.09 % sodium pyrophosphate solution which had been thoroughly degassed and the settling tendency was measured with a Satorius sedimentation balance type 4 600 at an advance of the recording paper of 120 mm/h. The calculation was made according to the known Stokes' formula and indicates the particle radius.

To determine the particle size distribution the air jet sieve analysis in accordance with DIN draft 53,734 was used.

Preparation of sintered plates

For this purpose a continuous band sintering device was used. Polyvinyl chloride powder was applied in a determined layer thickness on an endless steel band and for sintering the steel band was passed through a furnace the electric heating of which was adjusted to 350°C. By variation of the band speed the residence time in the sintering zone and hence the degree of sintering of the polyvinyl chloride powder was regulated. The band speed was adjusted to a value of from 2.0 and 2.3 m/min, preferably 2.2 m/min, so that the finished separating plate had a resistance of 1.6 mΩ/dm². The plates had a thickness of 0.50 mm and ribs of 1.1 mm.

Measurement of the elongation at break and tensile strength

In analogy with DIN 53,455 — tensile test of plastic materials — the elongation at break and the tensile strength were determined. As no standardized test specimens were available, test bars of the dimensions 60 × 140 mm were cut from the sintered plates and tested on a tensile tester in accordance with the general conditions for tensile testers (DIN 51,220, class 1 and DIN 51,221) after a storage for 16 hours under normal atmospheric conditions (DIN 50,014/1) at 23 ± 2°C and 50 ± 5 % of relative humidity. The testing speed, i.e. the speed at which the two clamps retired from each other, was 50 mm/min ± 10 %. The power measurement range was at 100 kg. Force and elongation were recorded on a diagram roll. The advance proportional to elongation (diagram paper : traverse) was adjusted enlarged to 5 : 1. The elongation was calculated on 100 mm of free length between the clamping points.

Measurement of the electric resistance

To determine the electric resistance of separating plates the so-called inner resistance of cells was determined in a special cell arrangement for this purpose (battery cell). The difference in the cell resistance with and without separating plate indicated the negative resistance of the separating body.

The testing cell consisted of a positive and a negative plate (PbO and Pb) placed parallel to each other at a distance of 7 mm. As electrodes plates having the size and construction as usual in lead accumulators were used. Exactly between the electrodes in a window-like opening of 100 × 100 mm the separating plate was inserted. The testing cell was filled with sulfuric acid having a density of 1.28 and was completely charged. To measure the low ohmic inner resistance a directly recording micro-ohmmeter (type EMT 326, Messrs. Elektromesstechnik W. Franz KG, Lahr) was connected to both electrodes. The measurement was carried out with alternating current from mains.

Measurement of water absorption

As a measurement for the porosity of the separating plates the water absorption according to DIN 51,056 was determined by storing the plates for 24 hours in water of 40°C and measuring the water absorption by weighing.

Measurement of the capillary rise

As a measurement for the wettability of the separating plates and to characterize the porosity a 1 cm wide strip of a plate was placed in a test tube filled with water to a height of 1.5 cm. The capillary rise is the height of wetting in mm after standing in water for 10 minutes.

The following examples illustrate the invention, the parts and percentages being by weight unless otherwise stated. The test values of the respective products and the separating plates made therewith are summarized in the Table.

EXAMPLE 1

A mixture consisting of 440.00 parts of vinyl chloride
870.00 parts of desalted water
2.2 parts of methyl cellulose (viscosity of 2 % solution at 20°C 400 centipoises)
0.66 part of n-dodecylbenzene sulfonic acid
0.22 part of polyoxyethylene sorbitan monolaurate
0.088 part of diisopropyl peroxydicarbonate was polymerized for 7 hours at 59°C in a 1,500 liter VA steel vessel at a stirring speed of 150 revolutions per minute. The fine-grained polymer sludge obtained was centrifuged on a decanter. The centrifuged product contained about 30 % of water. Before the material falling off the decanter was passed into a current drier 0.44 part of n-dodecylbenzenesulfonic acid was applied in the form of a 10 % aqueous solution through a nozzle by means of a pump. The treated polymer was then dried in a current drier with hot air (inlet temperature 150°C, outlet temperature 85°C). The properties of the dry polyvinyl chloride and of the separating plates made therefrom are summarized in the Table.

When the polymerization was carried out using the total amount of emulsifier all at once as described in Example 1 of our copending application referred to the polymer separated in the same manner had a water content of about 50 %. (With a polymer containing 25 to 30 % of water about 1,800 to about 1,400 kg can be passed through the drier per hour, while under identical conditions with a water content of about 50 % the throughput is 600 kg/h only.)

EXAMPLE 2

A mixture consisting of 440.00 parts of vinyl chloride
870.00 parts of desalted water
2.2 parts of methyl cellulose (viscosity of 2 % solution at 20°C 400 centipoises)
0.66 part of n-dodecylbenzenesulfonic acid
0.05 part of polyoxyethylene sorbitan monolaurate
0.088 part of diisopropyl peroxydicarbonate was polymerized under the conditions of Example 1. The finegrained polymer sludge obtained was centrifuged on a decanter. It contained about 25 % of water. In the manner described in Example 1 0.44 part of n-dodecylbenzenesulfonic acid and 0.05 part of polyoxyethylene sorbitan monolaurate were sprayed on the product as a mixture, each in the form of a 10 % aqueous solution. The treated polymer was dried in a current drier under the conditions of Example 1. The properties of the dry polyvinyl chloride and of the separating plates made therefrom are summarized in the Table.

Table

|  | Example 1 | Example 2 |
|---|---|---|
| K value | 65.3 | 66.0 |
| apparent density (g/l) | 460.0 | 470.0 |
| plasticizer absorption (DOP %) | 15.0 | 14.0 |
| average particle diameter (micron) | 22.0 | 25.0 |
| sieve analysis (%) | | |
| >33 μ | 89.0 | 75.0 |
| >33 μ <63 μ | 10.0 | 23.0 |
| >63 μ <125 μ | 1.0 | 2.0 |
| >125 μ | 0 | 0 |
| elongation at break (%) | 9.0 | 10.0 |
| tensile strength (kg/cm$^2$) | 110.0 | 145.0 |
| water absorption (%) | 58.0 | 40.0 |
| capillary rise (mm) | 150.0 | 125.0 |
| electric resistance mΩ/dm$^2$ with 0.5 mm thick plates | 1.2 | 1.7 |

What is claimed is:

1. In the process for making a pulverulent molding composition capable of being sintered of suspension polyvinyl chloride by polymerizing vinyl chloride in suspension in aqueous phase using an oil soluble activator in the presence of a suspension stabilizer, a non ionic wetting agent and an emulsifier, separating and drying the polymer, the improvement which comprises using as emulsifier of from 0.01 to 0.5 % by weight, calculated on monomeric vinyl chloride, of an alkylarylsulfonic acid having from 3 to 16 carbon atoms in the alkyl chain, or an alkylsulfonic acid having from 8 to 16 carbon atoms, or a mixture of the said sulfonic acids, about 30 to 80 % of the said emulsifier being added prior to and optionally during the course of polymerization and the balance of 70 to 20 % of emulsifier being applied to the polymer after its separation.

2. The process of claim 1, wherein 60 to 40 % of emulsifier are added prior to and optionally during the course of polymerization and the balance of 60 to 40 % is applied to the polymer after its separation.

3. The process of claim 1, wherein 70 to 0 % by weight of the suspension stabilizer and/or non ionic wetting agent are applied to the separated polymer.

4. The process of claim 1, wherein 40 to 0 % by weight of the suspension stabilizer and/or non ionic wetting agent are applied to the separated polymer.

5. Process for the manufacture of sintered porous shaped articles which comprises using a pulverulent suspension polyvinyl chloride produced by the process claimed in claim 1.

6. Process for the manufacture of separating plates for electric cells, which comprises using a pulverulent suspension polyvinyl chloride produced by the process of claim 1.

* * * * *